(12) United States Patent
Bloss et al.

(10) Patent No.: US 6,320,157 B1
(45) Date of Patent: Nov. 20, 2001

(54) CORONA STATION FOR THE PRELIMINARY PROCESSING OF A STRIP MATERIAL

(76) Inventors: Fritz Bloss, Sonnenrainweg 4, D-71297 Mönsheim; Klaus Dippmann, Pforzheimer Strasse 33, D-75233 Niefern, both of (DE)

(*) Notice: Subject to any disclaimer, the term of this patent is extended or adjusted under 35 U.S.C. 154(b) by 0 days.

(21) Appl. No.: 09/485,931
(22) PCT Filed: Oct. 6, 1999
(86) PCT No.: PCT/EP99/03989
 § 371 Date: Jun. 10, 2000
 § 102(e) Date: Jun. 10, 2000
(87) PCT Pub. No.: WO99/66615
 PCT Pub. Date: Dec. 23, 1999

(30) Foreign Application Priority Data

Jun. 17, 1998 (DE) .................................. 198 27 008
Jul. 13, 1998 (DE) .................................. 198 31 054
Aug. 3, 1998 (DE) .................................. 198 34 911

(51) Int. Cl.$^7$ .................................................. B23K 10/00
(52) U.S. Cl. .......................... 219/121.52; 219/121.48; 219/121.4; 427/569; 427/207.1; 264/483
(58) Field of Search .................... 219/121.43, 121.4, 219/121.52, 121.48; 361/213, 214, 221, 229; 427/569, 207.1, 39, 40, 41, 255.1, 301; 254/168, 165, 483

(56) References Cited

U.S. PATENT DOCUMENTS

| 4,024,038 | * | 5/1977 | Luc ........................................ 204/168 |
| 4,999,733 | * | 3/1991 | Kakuda ................................ 361/213 |
| 5,271,970 | * | 12/1993 | Griggin et al. ...................... 427/569 |

FOREIGN PATENT DOCUMENTS

| 2458499 | * | 12/1974 | (DE) . |
| 9538176 | * | 10/1995 | (DE) . |
| 0426880 | * | 5/1991 | (EP) . |
| 0510891 | * | 10/1992 | (EP) . |

* cited by examiner

*Primary Examiner*—Mark Paschall

(57) ABSTRACT

The present invention relates to a corona station for the preliminary processing of a strip material. The corona station includes at least one electrode (18) connected to a high-voltage power supply through connection means, a housing containing at least partially the electrode (18) and the connection means, and at least one cylindrical counter-electrode (17), wherein the strip of material (16) does not rest on the whole surface of said counter-electrode (17).

11 Claims, 3 Drawing Sheets

CORONA STATION FOR THE PRELIMINARY PROCESSING OF A STRIP MATERIAL

CROSS-REFERENCES TO RELATED APPLICATIONS

Not applicable.

Statement Regarding Federally Sponsored Research or Development

Not applicable.

BACKGROUND OF THE INVENTION

The invention relates to a corona station for pretreating on both sides a material web.

TECHNICAL FIELD

EP 0 426 880 has disclosed a corona station for treating plastic web materials which have a pattern created in surface portions thereof which is achieved as a direct result of a charge treatment. Therefore the material web is brought into contact with a portion of a circumferential surface of a counter-electrode. The circumferential surface of the counter-electrode has been engraved with a pattern for producing a selectively patterned, surface treated web.

Furthermore, a non-generic device for removing dust particles on material webs has been disclosed by EP 0 524 415 A2, an has two rod-shaped emission electrodes which run parallel to one another and are connected to an opposite potential, and between which the material web runs through. In the process, the dirt particles are charged, with the result that the latter can easily be detached from the material web and sucked off. Although this device has emission electrodes, it cannot be used for pretreating material webs. Even if this device were to be used the following disadvantages would occur. In this device, there is a need upstream and downstream of the emission electrodes for guide rolls which are rotatably mounted and must be coordinated with one another in terms of their circumferential speed in such a way that a certain web tension is maintained as the material web is being guided through the device. On the one hand, this is required in order not to damage the material web by making contact with the emission electrodes, and on the other hand in order to ensure a uniform air gap on the topside and bottom side relative to the emission electrodes so that adequate surface treatment is rendered possible. Moreover, this device also has a design which is complicated in terms of apparatus. The disadvantages arising therefrom with regard to the space requirement, mounting, maintenance etc., are obvious. Moreover, the failure rate by comparison with a single corona station is twice as high.

SUMMARY OF THE INVENTION

It is therefore the object of the invention to create a corona station which renders it possible to treat completely the surface of the material web on both sides in a simple and cost-effective way, without damaging the surface of the material web.

This object is achieved by an air nozzle provided at least upstream of the counter-electrode, seen in the conveying direction of the material web so that the material web does not bear with its whole surface against the counter-electrode.

Owing to the fact that the air nozzle is provided at least upstream to the counter-electrode it is possible by at least partially blowing in air between the material web and the counter-electrode that the material web does not bear with its whole surface against the counter-electrode. It is therefore possible to form a more or less completely constructed air gap between the counter-electrode and the material web to be treated. Consequently, both the surface of the material web pointed towards electrodes and the surface of the material web pointed towards the counter-electrode are completely surface-treated, since an air gap or a quasi air gap is formed on both surfaces. Due to blowing in air between the material web and the circumferential surface of the counter-electrode a plurality of air gaps in the depressions act like one quasi air gap. The corona treatment, rendered possible by the depressions, of the surface is emitted onto the linear or punctiform contacts of the material web on the counter-electrode, so that after leaving the counter-electrode the surface, pointing towards the counter-electrode, of the material web is essentially wholly surface-treated by a spill-over effect. Therefore, by contrast with prior attempts not to carry out any treatment on the counter-electrode, this development has chosen an avenue in the opposite direction, in accordance with which it is now possible to treat completely a material web on both sides with the aid of a corona station. It is ensured thereby that the material web does not bear its whole surface against the counter-electrode, but touches the surface covering the counter-electrode only very slightly in a linear or punctiform fashion. The construction of a grid is a feature of the invention in which the surface of the depressions is constructed into a multiple of the elevations, with the result that, on the one hand, an adequate bearing surface is created for the surface bearing against the counter-electrode and, on the other hand, the grid does not give the surface a structure.

According to a refinement of the invention, a further electrode is provided immediately after the material web lifts off the counter-electrode. The spill-over effect will be additionally strengthened.

According to a further refinement of the invention, it is provided that the grid extends perpendicular to the transport direction of the material web. The result is to enable the material web on the counter-electrode to be uniformly unwound and/or deflected without it being possible for the material web to be warped or deviate from the true course with respect to the conveying direction. Moreover, it is possible to counteract the formation of folds during deflection.

According to a further refinement of the invention, it is provided that the depression are arranged in a plurality of different grid patterns, or are distributed over the circumferential surface into partially identical or different grid patterns. As a result, it is possible to treat only specific surface sections, for example. Consequently, a specific pattern can be rendered possible on the basis of the printing which follows, for example, since without corona treatment the corresponding sections cannot accept coating materials.

The depression are introduced without cutting into the circumferential surface by means of a knurling device. Furthermore, it is advantageously possible to provide for it to be possible by laser machining or spark erosion, or by other alternative machining operations such as, for example, by chemical removal or the application of a coating, to achieve a grid-shaped or structured arrangement of depressions, or else also an irregular arrangement of depressions or a surface roughness which permits the formation of an at least partial air gap between the counter-electrode and that surface of the material web which is to be treated.

According to a further refinement of the invention, it is provided that a suction device is provided on the housing of the corona station or separately therefrom for the corona-treated surface on the counter-electrode. As a result, the ozone gas can be sucked off and disposed of or preprocessed in accordance with the safety rules.

The invention renders it possible for a device, known to date from the prior art, for one-sided web treatment now to be used and also retrofitted for two-sided material web treatment.

BRIEF DESCRIPTION OF THE DRAWINGS

The invention will now be explained with the aid of a preferred exemplary embodiment. In the drawing.

DETAILED DESCRIPTION OF THE INVENTION

Figure 1:
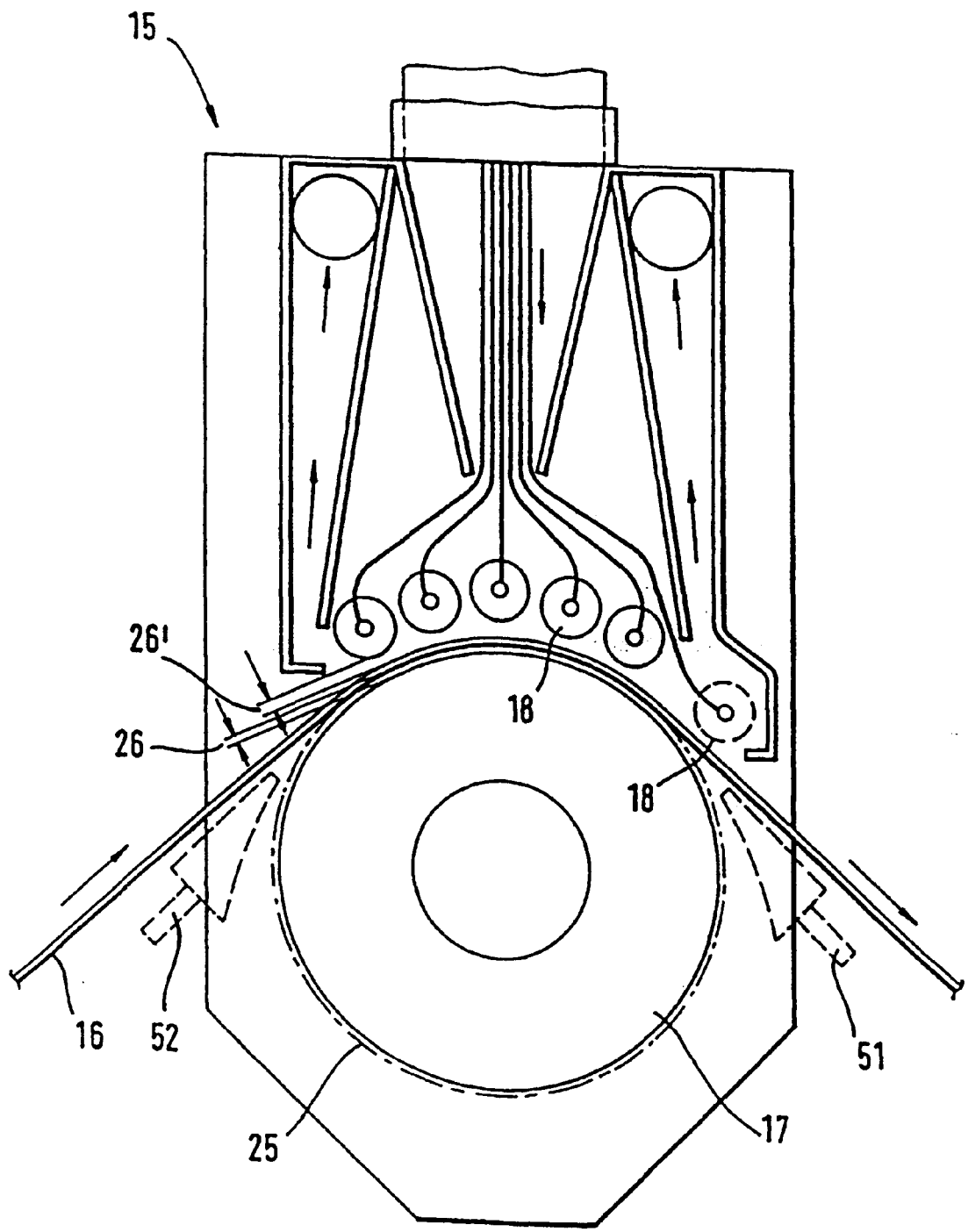
FIG. 1 shows a diagrammatic representation of corona station according to the invention.

FIG. 1 shows a corona station 15 for pretreating a material web 16 which is subsequently printed, coated or the like. The material web 16 can be any substrate which can be conveyed continuously or intermittently in machines or rolls. For example, such substrates can be homogeneous materials, likewise foam plastics or mesh materials which can have both conducting and nonconducting properties. For example, partially conductive materials can be assigned to the conductive materials or material webs. The geometry of the material web is mostly such that the thickness of the material web is smaller than the width. For example, in the case of pretreating a plastic film the thickness can vary from 0.01 to 5 mm, and the width from, for example, 30 to 10,000 mm. It goes without saying that the adaptation in width and thickness of the material webs to be treated can also be adapted to specific cases.

The corona station 15 has electrodes 18 which are assigned to a counter-electrode 17. The counter-electrode 17 is preferably designed as a non-driven roll. The material web 16 wraps around the counter-rolls 17, for example by 90° to 180°.

The voltage for the electrodes 18 is generated in a generator, it being possible to vary the appropriate power as a function of the treatment. The corona station 15 represented in FIG. 1 corresponds essentially to the corona station, known from the prior art, for one-sides pretreatment of material webs 16.

The corona station 15 according to the invention differs, however, in the configuration of the counter-electrode 17, which is adapted as a function of the material to be pretreated. By contrast with the counter-electrode known from the prior art, the counter-electrode 17 according to the invention does not have a smooth surface, but depressions dog, which are represented by dashes.

This exemplary embodiment with a counter-electrode 17 constructed from conducting material permits non-conducting material webs to be pretreated. In this refinement, the electrodes 18 are supplied with high voltage, whereas the counter-electrode 17 has an earth potential. It can also be notched. Owing to the configuration of the depressions 26 on the circumferential surface of the counter-electrode 17, it is possible for the material web 16 not to bear with its whole surface against the counter-electrode 17, and for a sort of air gap 26 to be formed such that the corona discharge takes place in the air gap 26. In addition to the customary air gap 26', formed between electrodes 18 and the material web 16, of a corona station 15 for one-sided web treatment, it is thereby possible to achieve the formation of a second quasi air gap 26 between the counter-electrode 17 and the material web 16, in order to permit double-sided pretreatment of the material web 16 by corona discharges.

In the treatment of a conductive material web 16, it is provided that high voltage is present both at the electrode 18 and at the counter-electrode 17, the earth potential being present at the conductive material web 16. The counter-electrode 17 has a circumferential surface which is constructed as a dielectric and in which depressions 25 are also provided. The counter-roll 17 is advantageously mounted in an insulated fashion. A conductive material web 16, for example aluminum foil, metal foils, metallized foils of the like can therefore be pretreated on two sides by means of corona discharge.

Provided advantageously downstream and/or to the side of the counter-electrode 17 seen in the withdrawal direction of the material web 16 is a suction device 51 by means of which the ozone formed by the corona discharge can be sucked off.

For the purpose of forming the quasi air gap 26 upstream of the counter-electrode 17 seen in the conveying direction of the material web 16 it is provided an air nozzle 52 which supports the formation of the air gap 26. The air nozzle 52 can extend over the entire width of the roll, or act only partially. Furthermore, the slot width of the air nozzle 52 can have sections differing in length and/or width.

It can advantageously be provided, furthermore, that an electrode 18 is arranged immediately after the material web 16 lifts off from the counter-electrode 17, in order to strengthen a spill-over effect on the surface pointing towards the counter-electrode 17, or to carry out an additional corona discharge.

In the following FIGS. 2 to 6, exemplary embodiments of depressions 25 and their cooperation with the material web 16, which does not bear with its whole surface against the counter-electrode 17, are discussed in more detail.

Figure 2A:
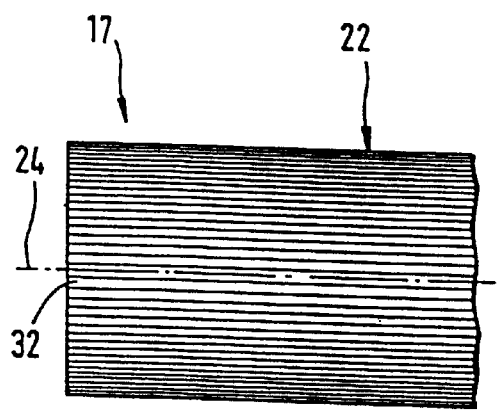
FIG. 2a shows diagrammatic view of a counter-electrode, configured according to the invention, with a knurled pattern which runs transverse to the transport direction.

A counter-electrode 17 designed as a roll is represented in FIG. 2a. It has depressions 32 which are arranged sagitally relative to the geometrical center axis 24. These depressions 32 form a knurling 22 which is constructed parallel to the geometrical rotation of longitudinal axis 24. This longitudinal correlation is provided at right angles to the conveying direction for transporting the material web 16

Figure 2B:
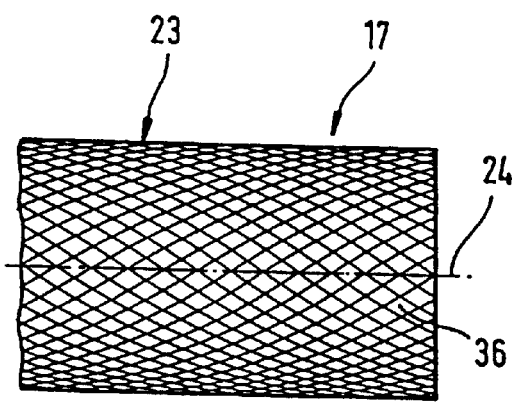
FIG. 2b shows a diagrammatic view of the counter-electrode, configured according to the invention, with a knurled pattern which is of rhombic design.

An alternative embodiment of the depressions 36 is represented in FIG. 2b. These form a rhombic knurling 23 which, by analogy with the depressions 32, are likewise formed sagitally relative to the geometrical center axis 24.

The concrete configuration of the depressions 25, 32, 36 can have a multiplicity of variations, it being necessary to set certain minimum preconditions, as will be further explained below.

The counter-electrode 17 can have only one knurling 22 or 23, for example, on its circumferential surface. However, it is also possible to provide an arbitrary arrangement of the knurlings 22, 23, if appropriate also only partially, on the counter electrode 17, it being possible for them to be adapted as a function of the respective application. Moreover, further types of depressions can be provided in combination.

It is also possible to provide the depression 25 only in sections both in the radial and in the axial directions, so that, for example, the pretreatment can apply a type of pattern to the material web 16, as a result of which partial surfaces of the material web 16 are surface-treated and other partial surfaces remain untreated.

It is also possible to provide that individual depression are of relatively large configuration, so that, on the basis of the large unoccupied space between the material web 16 and the counter-electrode 17, they act as insulation, as a result of which no pretreatment is performed in this region. Consequently, single-sided pretreatment of the material web 16 can be performed in sections on the surface facing the electrodes 18. This effect can also be provided by using insulating material in the counter-electrode 17.

In accordance with the present state of knowledge, the linear knurling 22 in accordance with FIG. 2a has very similar or identical properties to the knurling 23 in accordance with FIG. 2b. However, it is conceivable that further modifications of the knurling 22 or 23 with regard to the configuration of the surface and the size of the depressions 32, 36 and also with regard to the width of the depressions 32, 36 and to the size and shape of the sections 33 situated therebetween can deliver further positive effects which render possible a partial and/or complete surface treatment of the material web 16.

Figure 3:
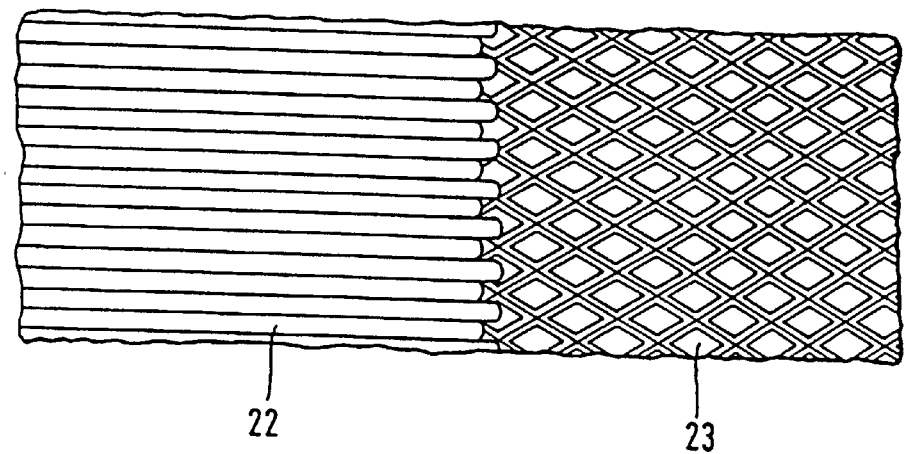
FIG. 3 shows a greatly enlarged section of mutually adjoining knurled patterns in FIGS. 2a and b of a counter-electrode.

Represented by way of example if FIG. 3 is an enlargement of a transition from the knurling 22 to the knurling 23. The transition does not impair the pretreatment of the surface in this region when such a combination is provided on a counter-electrode.

Figure 4:
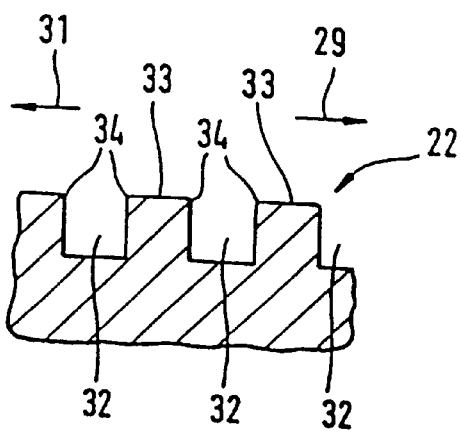
FIG. 4 shows an enlarged diagrammatic cross-sectional representation of the knurling configured transverse to the transport direction.

FIG. 4 shows a greatly enlarged view of a cross section of the knurling 22. The arrow 29 shows the direction of rotation with respect to the geometrical longitudinal axis 24. This can also be directed oppositely in accordance with the arrow 31. This can be advantageous, for example, whenever a roll consumed during operation in the direction 39 is rotated through 180° so that the direction of rotation is then in accordance with the arrow 31.

The knurling 22 has oblong depressions 32 which run parallel to the geometrical axis 24 and can have a U-shaped or rectangular cross section or the like. The sections 33 constructed between the depression 32 and which form this circumferential surface can advantageously lie on a radius of circle and be curved. Alternatively, it can be provided that these sections 33 are of rectilinear construction, with the result that when the material web 16 is wrapped around the circumferential surface of the counter-electrode 17 a small cavity forms between the outer corner points 34 of the sections 33 so as to reduce the bearing surface of the material web 16 relative to the circumferential surface of the counter-electrode. The configuration of the width, and the spacing of the oblong depressions 32 are such that the material web 16 does not sag into the oblong depression 32, or does so only negligibly. The depth of the depression 32 is adapted to the width of the depression 32, with the result that it can be ensured that the material web cannot come into contact with the base of the depression. The corner points 34 can advantageously be rounded formations, with the result that no impressions are left behind on the material web.

The configurations of the points of contact and/or lines of contact between the material web 16 and the counter-electrode 17 are advantageously mutually coordinated. On the one hand, the aim is for the surfaces of contact and/or points of contact to be so small as to achieve by the spill-over effect of the pretreated surface that the surfaces of contact are likewise pretreated downstream of the counter-electrode 17. On the other hand, the aim is for the counter-electrode 17, which is preferably not driven, to be dragged along by the material web 16 so that damage to the surface of the material web 16 can be avoided. Were a complete air gap 26 to be produced, the counter-electrode 17 would stand still, the result of which would be that, in the case of a reducing air gap 26, the material web 16 would briefly strike the counter-electrode 17 and surface damage would result owing to the increased friction.

Moreover, the knurling 22 can be of wave-shaped or U-shaped construction. Moreover, it can be advantageous, if appropriate, for the spacing of the depressions 32 to be formed nonuniformly or irregularly when seen radially. This can, for example, occur because the oblong depressions 32 and/or the sections 33 can be of wider or else narrower construction.

The circumferential surface of the counter-electrode 17 can be of metallic construction in the case of pretreating a non-conductive material web. Aluminum or an aluminum alloy or the like can advantageously be used. Further materials are likewise possible. The surface of the counter-electrode 17 can be finished after the introduction of the knurling 22, with the result that, for example, no burrs of sharp edges remain standing after the introduction of the depressions 25. This can be provided, for example, by applying a layer of silicone or the like. The circumferential surface of the counter-electrode 17 can furthermore, be finished with an anodized oxide layer or the like, in order moreover to permit a lengthening of the service life.

The production of the depression can, for example be rendered possible in the case of the knurling 22 by means of customary knurling techniques. Moreover, depressions deviating geometrically from this knurling 22 can be introduced without cutting or by spark erosion by means of laser technology, water jet cutting or etching or other abrading processes. In the last case, in particular, an irregular arrangement can be constructed.

In the case of the surface treatment of a conductive material web 16, the circumferential surface of the counter-electrode 17 is designed with a dielectric. A production method for introducing the depressions 32, 36 into the corresponding dielectric is thereby to be selected and adapted.

The non-conducive materials of a material web such as, for example, paper and plastics can likewise be treated with the aid of a counter-electrode having a dielectric.

Figure 5:
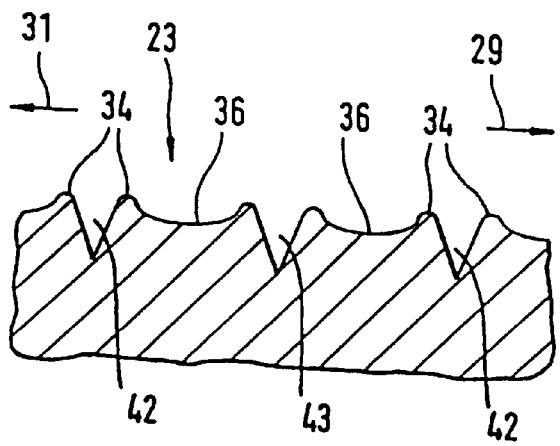
FIG. 5 shows a diagrammatically enlarged cross-sectional representation of the rhombic knurled pattern.
Figure 5:
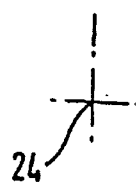
Figure 6:
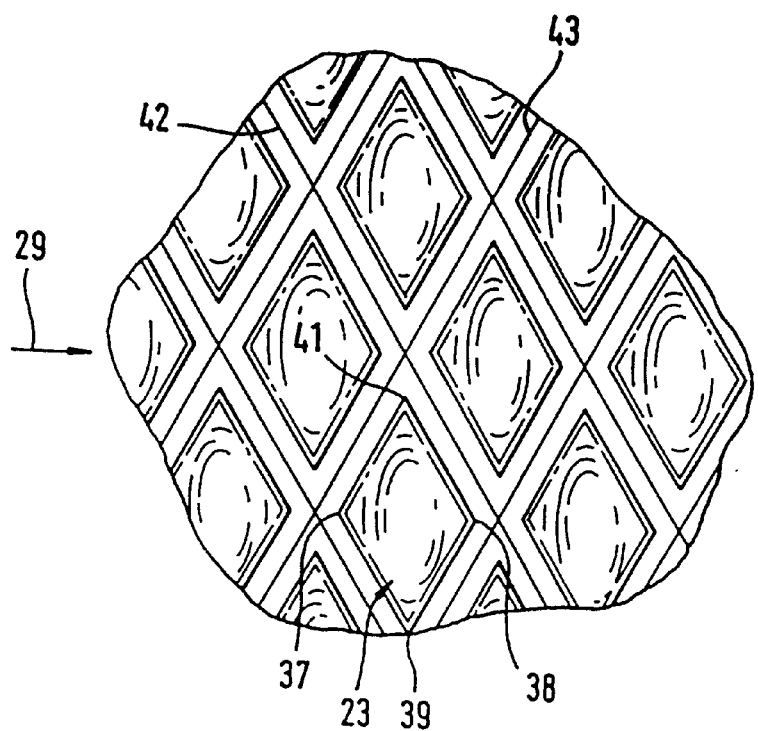
FIG. 6 shows a diagrammatically enlarged top view of the knurled pattern in accordance with FIG. 5.

A diagrammatically enlarged cross section of the knurling 23 is represented in FIG. 5. This rhombic knurling 23 is advantageously designed such that no preferred direction is provided. Consequently, the material web 16 can be deflected on the counter-electrode 17 without deviation in the direction of transport. It can also be provided that, for example, knurlings having preferred directions directed towards one another can respectively be provided on the outer edge regions of the counter-electrode 17, as a result of which it is possible to force the material web 16 into a corresponding direction of transport. The rhombic depressions 36 have corner points 37, 38 which are less far removed from one another that the distance between the corner Points 39 and 41. Since the tensions of the material web 16 runs perpendicular to the geometrical longitudinal axis 24, the span is therefore shorter and there is less risk that the material web 16 will sink in and thus the depth of the depression 36 will be reduced. Nevertheless, a sufficiently large air gap can be formed. Furthermore, not only are the depressions of the type of depressions 36 present here, but so are the furrows 42 and 43, which intersect at the four corner points 37, 38, 39, 41 at a constant angle. To this extent, FIG. 5 shows only a diagrammatic section, that is to say only the cut section and not, for example, also the perspectively running ridge lines from peak to peak.

The furrows 42, 43 run at the same angle with respect to the circumferential direction and are essentially situated in a bisecting fashion relative to the geometrical longitudinal axis 24. The knurling 23 therefore has a symmetrical design, with the result that the material web 16 has no tendency to run to the left or right. Should such a tendency be desired, it can be produced by consciously produced asymmetries in the grid pattern. Further knurlings, which are similar to that represented by way of example in FIGS. 2a, 2b and FIGS. 4 and 5, respectively, can likewise be used.

Because of the formation of a quasi air gap 26 between the counter-electrode 17 and the material web 16, ozone occurs in this air gap 26 through the corona discharge; it is set off via a suction device (not represented in more detail). This suction device is designed by an analogy with the suction device at electrodes 18, and treated in accordance with the safety rules, for example, via an ozone catalyst, with the result that the air/ozone mixture sucked off can be output into the environment after filtering.

During operation of the corona station 15, the power output by the electrodes 16, 17 is increased from, for example, 600 W for one-sided pretreatment of the material web 16 to approximately 800 W for two-sided pretreatment of the material web 16. However, this power can be set in a fashion specific to the application, the power to be output essentially being governed by the width of the foil and by the foil speed. The result of the pretreatment is that the surface tension of, for example, 32 ON/mm$^2$ can be increased to a value of approximately 56 ON/mm$^2$.

Thus, by means of the invention, corona stations already in use can be retrofitted in a simple and cost-effective way for two-sided pretreatment of the material web, this being done by exchanging the counter-electrode 17 and adapting the power of the generator.

There is a specific numerical relationship between the contact surfaces of the points of contact, the blowing in of air and the depression on the circumferential surface of the counter-electrode 17. On the one hand, it is necessary for the circumferential surface of the counter-electrode 17 to define a minimum supporting surface so that there is no damage to or impairment of the material web 16 owing to peaks or depressions or the like, and so that, on the other hand, an air gap of sufficient size can be achieve in order to render the pretreatment possible. Moreover, to treat the web over its whole surface the pretreatment must occupy a surface of the material web 16 such that a spill-over effect can be provided despite the contact surfaces on the counter-electrode 17, with the result that the regions of the material web 16 which adjoin the counter-electrode 17 can likewise be broken up and thus pretreated on the surface, if appropriate after leaving the counter-electrode 17. This degree of spill-over is also dependent, inter alia, on the power of the electrode 18 and of the counter electrode 17.

The design of the counter-electrode 17 requires at least a coordination of the size and shape of the depression 32, 36 with the depth of the depression 32, 36 and also with the sections 33 situated therebetween. The web speed is also to be taken into account. In this case of speeds of the material web 16 below approximately 200 m/min., the material web is scarcely raised from the counter-electrode 17, with the result that the grid is to be of correspondingly smaller construction, that is to say the lines or points of contact are more closely interspaced. The effect occurring from the web speed is dependent in turn on the angle of wrap of the material web 16 on the counter-electrode 17 and is to be taken into account, the smaller the angle of wrap, the higher the possible web speed, and the further from one another the lines or points of contact can be spaced. The web speed is also to be adapted so that it remains possible to control the lateral course. It is advantageous to coordinate the design of the knurling with the sensitive materials, low web speeds and high angle of wrap, in order to create a counter-electrode 17 which can be used universally.

What is claimed is:

1. A corona station for pretreating a material web, having at least one electrode, which can be connected to a high-voltage supply via connecting means, a housing which at least partially accommodates the electrode and the connecting means, and having at least one counter-electrode of cylindrical construction, the counter-electrode has depressions on its circumferential surface, the depressions are arranged at least in subregions in the form of a regular grid, characterized in that an air nozzle is provided at least upstream of the counter-electrode, seen in the conveying direction of the material web and the material web does not bear with its whole surface against the counter-electrode.

2. The corona station according to claim 1, characterized in that a further electrode is provided immediately after the material web lifts off the counter-electrode.

3. The corona station according to claim 1, characterized in that transverse to the transport direction the grid has at least no substantial preferred direction.

4. The corona station according to claim 1, characterized in that the depressions are distributed in a plurality of different grid patterns or in partially identical or different grid patterns over the circumferential surface of a counter-electrode.

5. The corona station according to claim 1, characterized in that the depressions are preferably introduced or applied in the circumferential surface of the counter-electrode without cutting.

6. The corona station according to claim 5, characterized in that the depressions are impressed into the circumferential surface with the aid of a knurling tool.

7. The corona station according to claim 1, characterized in that a suction device is provided on the housing, or in a fashion indirectly connected thereto, for the corona-treated underside of the material web.

8. The corona station according to claim 1, characterized in that for pretreating a non-conductive material web the depressions are provided directly in a conducting circumferential surface of the counter-electrode.

9. The corona station according to claim 1, characterized in that for pretreating a conductive of partially conductive material web the counter-electrode is provided with high voltage, and the counter-electrode has a circumferential surface which is provided with a dielectric and in which the depressions are provided.

10. The corona station according to claim 9, characterized in that the conductive or partially conductive material web has an earth potential.

11. The corona station according to claim 9, characterized in that the counter-electrode is rotatably mounted in an insulated fashion.

* * * * *